Patented May 30, 1950

2,509,387

UNITED STATES PATENT OFFICE 2,509,387

DIBENZOPYRAN MARIHUANA-LIKE COMPOUNDS

Roger Adams, Urbana, Ill.

No Drawing. Application April 10, 1947, Serial No. 740,729

8 Claims. (Cl. 260—333)

The present invention relates to physiologically active marihuana-like compounds and processes of preparing the same. More specifically the present invention relates to novel 1-hydroxy - 3 - (alkyl) - 6,6,9-trimethyl-7,8,9,10-tetrahydro-6-dibenzopyrans in which the 3-position is occupied by an aliphatic hydrocarbon chain containing as substituents at least two alkyl groups.

Since the discovery that certain dibenzopyran compounds characterized by marihuana-like activity possessed utility in the therapeutic field as, for example, in the treatment of "dope" addicts and alcoholics, and particularly to eliminate or ameliorate the withdrawal symptoms experienced in the treatment of opiate derivative addictions, various investigators have attempted to prepare improved compounds in this field. Illustrative examples are reported in both the domestic and foreign scientific literature as well as in my U. S. Patents 2,419,934 and 2,419,935, both dated May 6, 1947. For the most part it has been found that modifications in the complex dibenzopyran molecule were deleterious, e. g., produced relatively toxic compounds or compounds with reduced potency or lacking entirely in the desired physiological activity.

The principal object of the present invention is to provide improved marihuana-like compounds and processes of preparing the same.

Other objects of the present invention will be apparent as the detailed description proceeds hereinafter.

In continued investigations I have discovered that the 1 - hydroxy-3-(alkyl)-6,6,9-trimethyl-7,8,9,10-tetrahydro-6-dibenzopyrans may be improved by providing the aliphatic hydrocarbon chain at the 3-position with multi alkyl (at least two) substituents. The new compounds characterized by the new type alkyl side chain are more active than corresponding compounds having n-alkyl side chains or side chains with less than two alkyl substituents. The 3-(1',2'-dimethylheptyl) compound, for example, is 60 to 70 times more active than the natural 3-(n-amyl) tetrahydrocannabinol.

The alkyl group at the 3-position always contains at least five carbon atoms, three of which are in a straight chain. In the formulas given below, while R in formulas IX—XV represents alkyl groups such as methyl, ethyl, propyl, butyl, amyl, hexyl, heptyl, octyl, nonyl, decyl, etc., the total number of carbon atoms in the straight chain including the R group, is preferably 3 to 10. The two methyl groups shown in formulas VIII—XV as substituted on the carbon atom attached to the ring may equally well be any other alkyl groups but preferably are alkyl groups containing 1 to 5 carbon atoms. The following examples will serve to illustrate the present invention.

The process employed in preparing the 1',1'-dialkyl substituted hydrocarbon side chains of Examples I and II may be illustrated by the following series of reactions. The numbers under the compounds identify the products in Example I.

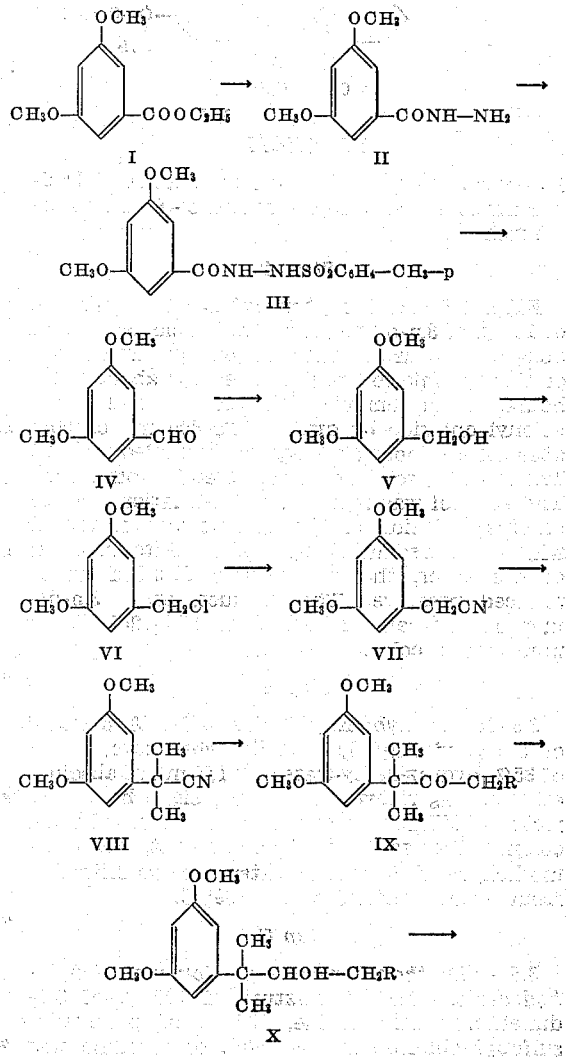

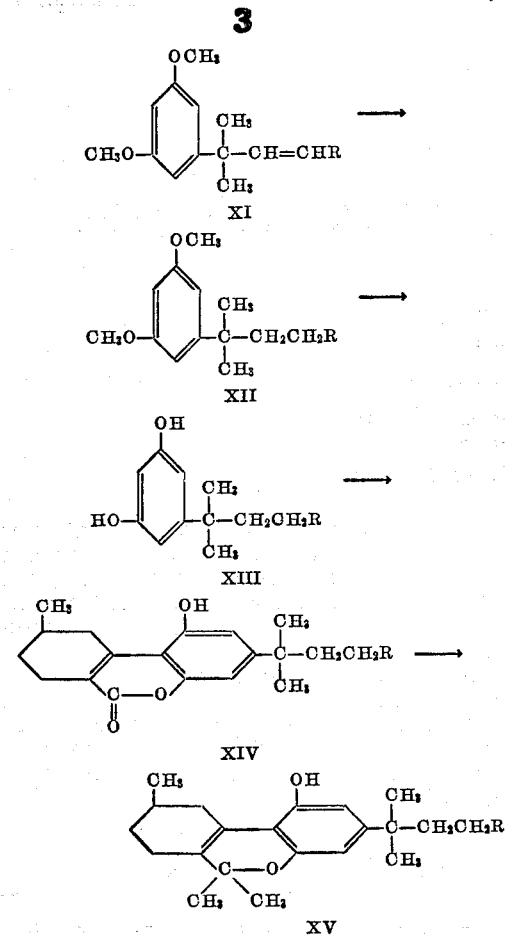

EXAMPLE I

1 - Hydroxy - 3 - (1',1' - Dimethylbutyl) - 6,6,9-Trimethyl - 7,8,9,10-Tetrahydro - 6 - Dibenzopyran

Step A

*Ethyl 3,5-dimethoxybenzoate.*—(I) A mixture of 100 g. of 3,5-dimethoxybenzoic acid, 350 ml. of anhydrous benzene, 2 ml. of pyridine and 300 g. of thionyl chloride was refluxed for about three hours. After removal of the solvent and excess thionyl chloride by distillation, 300 ml. of cold absolute ethanol was added to the cooled residue. The resulting solution was refluxed for four hours. The ethanol was removed by distillation and an ethereal solution of the residue was extracted with aqueous sodium bicarbonate. After removal of the ether, the residue was distilled under reduced pressure. The product, ethyl 3,5-dimethoxybenzoate, collected at 120–125° C. (3 mm.) was a colorless liquid.

Step B

*3,5-dimethoxybenzhydrazide.*—(II) A mixture of 100 g. of ethyl 3,5-dimethoxybenzoate, 100 g. of 85% hydrazine hydrate and 110 ml. of absolute ethanol was refluxed for about eight hours. A yield of brilliant white plates was obtained upon cooling the solution. The product, 3,5 - dimethoxybenzhydrazide, after recrystallization from ethanol, melted at 168–169° C.

Step C

*3,5 - dimethoxybenzoyl - p - toluenesulfonyl - hydrazide.*—(III) A mixture of 100 g. of 3,5-dimethoxybenzhydrazide, 100 g. of p-toluenesulfonyl chloride and 100 ml. of pyridine was heated for about one hour on a steam cone and then allowed to stand overnight. The solution was poured into 750 ml. of water and stirred until a granular, light brown solid was produced. The product, 3,5 - dimethoxybenzoyl - p - toluene - sulfonylhydrazide, was purified by recrystallization from aqueous ethanol and was obtained as large brilliant plates, melting at 165–166° C.

Step D

*3,5-dimethoxybenzaldehyde.*—(IV) Into a 1. Erlenmeyer flask heated by an oil bath was placed 100 ml. of glycerol and 25 g. of 3,5-dimethoxybenzoyl-p-toluenesulfonylhydrazide. The mixture was stirred manually and heated to 125° C. A hot (100° C.) solution of 20 g. of potassium carbonate in 100 ml. of glycerol was added all at once. The solution was heated rapidly to 135–140° C. and maintained at this temperature for about thirty seconds. After the evolution of gases partially subsided the solution was poured onto 300 g. of ice. The aqueous suspension was extracted three times with ether and the ether portions were combined and dried over anhydrous magnesium sulfate. After removal of the ether, the liquid residue was distilled under reduced pressure. The fraction collected at 125–130° C. (1–2 mm.) was crude aldehyde and was purified by recrystallization from petroleum ether (B. P. 90–110° C.). The 3,5-dimethoxybenzaldehyde was obtained as fine lusterless needles melting at 45–46° C.

Step E

*3,5-dimethoxybenzyl alcohol.*—(V) The aldehyde (IV) obtained in Step D, was hydrogenated at room temperature and at 2–3 atm. pressure in the presence of platinum oxide catalyst. Ethanol was used as the solvent. The 3,5-dimethoxybenzyl alcohol was obtained as fine white needles, melting at 47–48° C.

Step F

*3,5-dimethoxybenzyl chloride.*—(VI) A solution of 22.5 g. of thionyl chloride in 100 ml. of anhydrous ether was added in 20-ml. portions with occasional shaking to a solution of 15 g. of 3,5-dimethoxybenzyl alcohol and one ml. of pyridine in 200 ml. of anhydrous ether. The mixture was allowed to stand for about fifteen minutes and then was extracted twice with 100-ml. portions of cold water. The ether was allowed to evaporate in vacuo at low temperature. The crude chloride was purified by recrystallization from petroleum ether (B. P. 90–110° C.) The 3,5-dimethoxybenzyl chloride was obtained as fine needles, melting at 46° C.

Step G

*3,5-dimethoxybenzyl cyanide.*—(VII) A mixture of 16 g. of 3,5-dimethoxybenzyl chloride, 300 ml. of ethanol, 30 g. of sodium cyanide and 75 ml. of water was refluxed for about three hours. The solution was poured onto 400 g. of ice. The solid was collected on a filter and purified by recrystallization from petroleum ether (B. P. 90–110° C). The 3,5-dimethoxybenzyl cyanide was obtained as fine lusterless needles, melting at 53° C.

Step H

*2 - (3,5 - dimethoxyphenyl) - 2 - methyl - propionitrile.*—(VIII) The benzyl cyanide was alkylated using a slight modification of the procedure described by Smith and Spillane for the preparation of 2 - methyl - 2 - phenylpropionitrile J. Am. Chem. Soc. 65, 202 (1943). The sodamide solution obtained from 3.5 g. of sodium, 200 ml. of liquid ammonia and a few crystals of ferric nitrate was allowed to evaporate to a volume of about 75 ml. The remaining ammonia was displaced by 200 ml. of anhydrous ether, and a solution of 25 g. of 3,5-dimethoxybenzyl cyanide in 100 ml. of anhydrous ether was added all at once and the mixture refluxed for about eighteen hours. Then 25 g. of methyl iodide was added to the cooled solution as rapidly as possible with stirring. The solution was refluxed for about two hours, heating was discontinued, and 50 ml. of ethanol was added with stirring. After washing and drying, the reaction mixture was again subjected to methylation.

When reaction was complete the solvent was removed and the crude product obtained by distillation under reduced pressure was heated for one hour with one-quarter of a tablespoonful of Raney nickel and 200 ml. of absolute ethanol.

Upon fractionation, the desired nitrile was obtained as a colorless product, B. P. 147–150° C. at atm. pressure.

Step I

2 - methyl - 2 - (3,5 - dimethoxyphenyl) - 3 - pentanone.—(IX) A solution of 26 g. of 2-methyl-2-(3,5-dimethoxyphenyl)-propionitrile in 100 ml. of anhydrous ether was added to the Grignard reagent prepared from 41.2 g. of ethyl bromide, 5.9 g. of magnesium, and 200 ml. of dry ether. The ether was replaced by 300 ml. of dry benzene and the solution was refluxed for about forty-eight hours. The reaction mixture was decomposed with dilute sulfuric acid, and the benzene was removed by distillation. The resulting mixture of acid and crude ketone was heated for an additional two hours on the steam cone. After cooling, the mixture was extracted with ether, and the ether was removed. The crude ketone after distilling twice under reduced pressure was obtained as a colorless liquid, B. P. 104° C. (0.3 mm.).

Step J

2 - methyl - 2 - (3,5 - dimethoxyphenyl) - 3 - pentanol.—(X) The ketone (IX) obtained in Step I was hydrogenated at a temperature of 150–170° C. under a pressure of hydrogen of 3000 pounds in the presence of copper chromite. The product was fractionated under reduced pressure, those fractions having $n_D^{20}$ 1.5249±0.0001 being combined. The desired pentanol was obtained as a colorless, viscous liquid, B. P. 129–130° C. (0.5 mm.).

Step K

2 - methyl - 2 - (3,5-dimethoxyphenyl)-3-pentene.—(XI) A solution of 15.2 g. of the pentanol in 100 ml. of dry ether was allowed to react over a six hour period with a suspension of 2.5 g. of metallic potassium in 200 ml. of ether. An equimolar quantity of carbon disulfide was added and the mixture was stirred for one-half hour. To the thick white mass was added 9.0 g. of methyl iodide. The suspension was refluxed for six hours and allowed to stand overnight. The potassium iodide was removed by filtration. After removal of the ether, the yellow residue was placed in a flask and distilled under reduced pressure. About one-half hour of careful heating was necessary before the actual distillation of the light yellow product began. An alcoholic solution of the distillate was refluxed with Raney nickel and redistilled. The desired pentene was a colorless liquid, B. P. 103–106° C. (0.5 mm.).

Step L

2 - methyl - 2 - (3,5-dimethoxyphenyl)-3-pentane.—(XII) The pentene (XI) obtained in Step K was reduced with hydrogen and Raney nickel at 2–3 atm. pressure and room temperature. The desired pentane had a boiling point of 115–117° C. (1.5–2 mm.).

Step M (1',1'-dimethylbutyl)-3,5-dihydroxybenzene.—(XIII) About 8 g. of the dimethyl ether of the pentane (XII) obtained by the process of Step L was hydrolyzed (demethylated) by refluxing for about 4½ hours in a solution made up of about 20 cc. of 48 per cent hydrobromic acid and about 75 cc. of glacial acetic acid, and then worked up in accordance with Step D of Example I of my copending application Serial No. 600,414 filed June 19, 1945. As pointed out in my prior application the acid reaction mixture is poured into an ice-water mixture, extracted with ether, the ether extract neutralized with bicarbonate solution, extracted with sodium hydroxide solution, the alkaline extract made acid to Congo red paper with HCl and again extracted with ether, the ether extract dried over sodium sulfate, the ether removed by distillation, and the desired dihydroxybenzene distilled under reduced pressure. The final product obtained boiled at 151–154° C. at 1 mm. pressure.

Step N 1-hydroxy-3-(1',1'-dimethylbutyl) - 9 - methyl-7,8,9,10 - tetrahydro - 6 - dibenzopyrone.—(XIV) This product was prepared in accordance with the process set forth in my last mentioned copending application for refluxing for about five minutes about 5.3 g. of dihydroxybenzene (XIII) obtained by the process of Step M with about 5.3 g. of ethyl 5-methyl-cyclohexanone-2-carboxylate in a reaction mixture containing about 5 g. of phosphorus oxychloride in 100 cc. of dry benzene and then allowing to stand at room temperature for 18 hours. As pointed out in my prior application, the reaction mixture is poured into ice water containing sufficient bicarbonate solution to neutralize the acid present, and the benzene then removed by evaporation. The desired pyrone product after recrystallization from a mixture of ethanol and water was obtained as white crystals melting at 218–220° C.

Step O 1-hydroxy-3-(1',1'-dimethylbutyl) - 6,6,9 - trimethyl-7,8,9,10 - tetrahydro - 6 - dibenzopyran.—(XV) This product was prepared in accordance with the procedure set forth in my above copending application by reacting about 5.8 g. of the pyrone (XIV) obtained by the process of Step N with a Grignard reagent prepared from 5.4 g. of magnesium and 31.5 g. of methyl iodide in 200 cc. of anhydrous ether. As pointed out in my prior application, an equal volume of benzene was added, the ether distilled off, the reaction mixture refluxed for about 18 hours, the Grignard compound decomposed with an ice-sulfuric acid mixture, the aqueous layer extracted with ether and joined with the benzene layer, and the solvents removed by evaporation. The desired pyran product was obtained as a viscous oil boiling at 158° C. at 0.02 mm. pressure.

EXAMPLE II

1-HYDROXY - 3 - (1',1' - DIMETHYLHEPTYL) - 6,6,9-TRIMETHYL - 7,8,9,10-TETRAHYDRO - 6 - DIBENZOPYRAN

This product was prepared in accordance with the procedures described in detail under Example I. The nitrile (VIII) was prepared in accordance with Steps A to H inclusive.

Step I

*2-methyl-2-(3,5 - dimethoxyphenyl) - 3 - octanone.*—This product was prepared in accordance with Step I by reacting the nitrile with n amyl magnesium bromide. The desired octanone boiled at 140–145° C. (0.5 mm.).

Step J

*2 - methyl - 2 - (3,5-dimethoxyphenyl)-3-octanol.*—This product prepared in accordance with Step J boiled at 162° C. (0.5 mm.).

Step K

*2 - methyl - 2 - (3,5-dimethoxyphenyl)-3-octene.*—This product prepared in accordance with Step K boiled at 127–130° C. (0.5 mm.).

Step L

*2-methyl-2-(3,5-dimethoxyphenyl) - octane.*—This product prepared in accordance with Step L boiled at 122° C. (0.5 mm.).

Step M

*(1',1' - dimethylheptyl) - 3,5 - dihydroxybenzene.*—This product prepared in accordance with Step M boiled at 161–163° C. (0.5 mm.).

Step N

*1-hydroxy-3-(1',1'-dimethylheptyl)-9-methyl-7,8,9,10-tetrahydro-6-dibenzopyrone.*—This product was prepared in accordance with Step N. Upon recrystallization from aqueous ethanol or from nitromethane it was obtained as white crystals melting at 156–157° C.

Step O

*1-hydroxy-3-(1',1'-dimethylheptyl) - 6,6,9-trimethyl-7,8,9,10 - tetrahydro - 6 - dibenzopyran.*—This product was prepared in accordance with Step O and was obtained as a viscous oil boiling at 174–176° C. at 0.04 mm. pressure.

The process employed in preparing the 1',2'-dialkyl substituted alkyl side chains of Examples III, IV and V may be illustrated by the following series of reactions. In the formulas given below, while R in formulas I'—VII' represents alkyl groups such as methyl, ethyl, propyl, butyl, amyl, etc., the total number of carbon atoms in the straight chain including the R group is preferably 3 to 10. The R' represents an alkyl group such as methyl, ethyl, propyl, butyl, etc., but preferably an alkyl group containing 1 to 5 carbons. Moreover, the methyl group attached to the second carbon atom from the ring may be a larger alkyl group such as ethyl, propyl, etc., but is preferably a group not containing over 5 carbon atoms.

The numbers under the compounds identify the products in Example III.

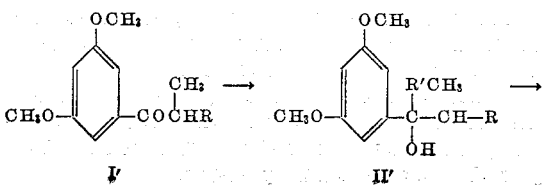

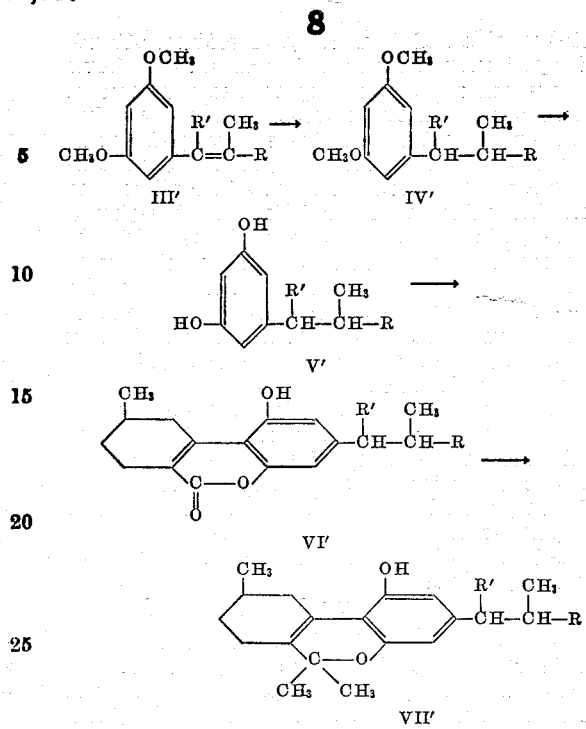

EXAMPLE III

1 - HYDROXY - 3 - (1',2' - DIMETHYLBUTYL) - 6,6,9-TRIMETHYL-7,8,9,10 - TETRAHYDRO - 6 - DIBENZOPYRAN. (VII)—

Step A'

*2-(3,5-dimethoxybenzoyl)-butane.*—(I') In a three-necked flask equipped with mechanical stirrer, dropping funnel and condenser, was prepared a Grignard reagent from 102 g. of sec.-butyl bromide, 18 g. of magnesium turnings and 300 ml. of anhydrous ether. The dropping funnel was removed and a 300-ml. Erlenmeyer flask containing 22 g. of 3,5-dimethoxybenzamide was connected to the reaction flask by means a piece of large-diameter rubber tubing. The amide was added as rapidly as possible. The contents of the flask were refluxed for about three hours. The solution was poured into 600 ml. of water and 100 g. of sulfuric acid. After decomposition was complete, the ether layer was separated and the aqueous portion extracted with 100 ml. of ether. The residue, after distillation of the ether, was heated in 150 ml. of absolute ethanol and refluxed for one hour with a teaspoonful of Raney nickel. The desired butane which was then distilled, boiled at 124–128° C. (0.5 mm.).

Step B'

*2-(3,5-dimethoxyphenyl) - 3 - methyl - 2 - pentene.*—(III') A solution of 20.5 g. of 2-(3,5-dimethoxybenzoyl)-butane in 100 ml. of dry ether was added rapidly, with stirring, to a Grignard reagent from 3.9 g. of magnesium turnings, 22.5 g. of methyl iodide and 150 ml. of anhydrous ether. After refluxing for two hours, the mixture was poured into 300 g. of ice containing 30 g. of sulfuric acid. The ether layer was separated and the aqueous layer extracted with ether. After washing and drying and removal of solvent, the residue was treated with six drops of 20% sulfuric acid and placed in a Claisen flask. Evolution of gas ceased in about a half-hour under gentle heating and the product was then distilled. The crude distillate was dissolved in absolute ethanol and refluxed with Raney nickel. After filtration and removal of solvent, the desired pentene boiled at 110° C. (1.0 mm.). In this step the alcohol intermediate (II') is produced when the ketone is treated with the Grignard reagent. The alcohol, however, is not isolated but is dehydrated immediately to the olefin (III') as described above.

Step C'

2-(3,5-dimethoxyphenyl)-3-methylpentane.—(IV') The reduction of the pentene with hydrogen was carried out in ethanol at 175° C. and 4400 lbs. pressure with copper chromite as a catalyst. Two successive reductions may be employed to make certain that the reduction is complete. The desired pentane was obtained as a colorless liquid, B. P. 98–100° C. (0.5 mm.).

Step D'

(1',2'-dimethylbutyl)-3,5-dihydroxybenzene.—(V') The dimethyl ether of the pentane obtained in Step C' was demethylated in accordance with Step M of Example I. The desired dihydroxybenzene boiled at 145–146° C. (1.0 mm.).

Step E'

1-hydroxy-3-(1',2'-dimethylbutyl)-9-methyl-7,8,9,10-tetrahydro-6-dibenzopyrone.—(VI') This product was prepared in accordance with Step N of Example I by reacting (1',2'-dimethylbutyl)-3,5-dihydroxybenzene with ethyl 5-methylcyclohexanone-2-carboxylate in the phosphorus oxychloride-anhydrous benzene reaction mixture. The desired pyrone product after recrystallization from ethanol and water was obtained as white crystals melting at 177–178° C.

Step F'

1-hydroxy-3-(1',2'-dimethylbutyl)-6,6,9-trimethyl-7,8,9,10-tetrahydro-6-dibenzopyran.—(VII') This product was prepared in accordance with Step O of Example I by treating the pyrone product of Step E' with methyl magnesium iodide as the Grignard reagent. The desired dibenzopyran boiled at 160–162° C. at 0.02 mm. pressure.

EXAMPLE IV

1-Hydroxy-3-(1',2'-Dimethylheptyl)-6,6,9-Trimethyl-7,8,9,10-Tetrahydro-6-Dibenzopyran

Step A'

2-(3,5-dimethoxybenzoyl)-heptane.—This product was prepared in accordance with Step A' of Example III by reacting the 3,5-dimethoxybenzamide with a Grignard reagent prepared from the bromide of methyl n-pentyl carbinol. The desired product boils at 147° C. (1.0 mm.).

Step B'

2-(3,5-dimethoxyphenyl)-3-methyl-2-octene.—This product was prepared in accordance with Step B' of Example III by reacting the ketone (Step A') with the methyl magnesium iodide as the Grignard reagent. The desired octene product boils at 132–134° C. (1.0 mm.).

Step C'

2-(3,5-dimethoxyphenyl)-3-methyloctane.—This product was prepared by the reduction of the octene in accordance with Step C' of Example III. The desired octane product boils at 120° C. (0.5 mm.).

Step D'

(1',2'-dimethylheptyl)-3,5-dihydroxybenzene.—The dimethyl ether of the octane obtained in the above step was demethylated in accordance with Step M of Example I. The desired dihydroxybenzene product boils at 167–169° C. (1.0 mm.).

Step E'

1-hydroxy-3-(1',2'-dimethylheptyl)-9-methyl-7,8,9,10-tetrahydro-6-dibenzopyrone.—This product was prepared in accordance with Step N of Example I by reacting (1',2'-dimethylheptyl)-3,5-dihydroxybenzene with the ethyl 5-methyl-cyclohexanone-2-carboxylate. The desired pyrone product after recrystallization from ethanol and water or nitromethane was obtained as white crystals melting at 134–136° C.

Step F'

1-hydroxy-3-(1',2'-dimethylheptyl)-6,6,9-trimethyl-7,8,9,10-tetrahydro-6-dibenzopyran.—This product was prepared in accordance with Step O of Example I by treating the pyrone with the methyl magnesium iodide as the Grignard reagent. The desired dibenzopyran product boils at 170–173° C. (0.04 mm.).

EXAMPLE V

1-Hydroxy-3-(1'-Ethyl-2'-Methylpropyl)-6,6,9-Trimethyl-7,8,9,10-Tetrahydro-6-Dibenzopyran

Step A'

2-(3,5-dimethoxybenzoyl)-propane.—This product was prepared in accordance with Step A' of Example III by reacting the 3,5-dimethoxybenzamide with isopropyl magnesium bromide as the Grignard reagent. The desired propane product boils at 117–119° C. (1.0 mm.).

Step B'

3-(3,5-dimethoxyphenyl)-2-methyl-2-pentene.—This product was prepared in accordance with Step B' of Example III by reacting the propane (Step A') with ethyl magnesium bromide as the Grignard reagent. The desired pentene product boils at 102–106° C. (0.5 mm.).

Step C'

3-(3,5-dimethoxyphenyl)-2-methylpentane.—This product was prepared by the reduction of the pentene in accordance with Step C' of Example III. The desired pentane product boils at 104° C. (0.5 mm.).

Step D'

(1'-ethyl-2'-methylpropyl)-3,5-dihydroxybenzene.—The dimethyl ether of the pentane obtained in the above step was demethylated in accordance with Step M of Example I. The desired dihydroxybenzene product boils at 145° C. (0.5 mm.).

Step E'

1-hydroxy-3-(1'-ethyl-2'-methylpropyl)-9-methyl-7,8,9,10-tetrahydro-6-dibenzopyrone.—This product was prepared in accordance with Step N of Example I by reacting (1'-ethyl-2'-methylpropyl)-3,5-dihydroxybenzene with the ethyl 5-methylcyclohexanone-2-carboxylate. The desired pyrone product after recrystallization from ethanol and water was obtained at white crystals melting at 181–182° C.

Step F'

1-hydroxy-3-(1'-ethyl-2'-methylpropyl)-6,6,9-trimethyl-7,8,9,10-tetrahydro-6-dibenzopyran.—This product was prepared in accordance with Step O of Example I by treating the pyrone with the methyl magnesium iodide as the Grignard reagent. The desired dibenzopyran product boils at 176° C. at 0.10 mm. pressure.

Other products may be prepared in accordance with the procedures set forth in the above examples by employing different alkylating agents and different Grignard reagents. Illustrative examples of 3-alkyl groups falling within the scope of the present invention are: (1',1'-dimethyloctyl); (1'-ethyl-2'-propylhexyl); (1'-propyl-2'-butylheptyl); (1'-methyl-2'-methyloctyl); (1',1'-dimethylhexyl), and 1'-amyl-2'-methyldecyl). The alkyl substituents may be at various positions on the straight chain although investigations indicate preferred compounds have at least one substituent at the 1-position or substituents at least one of which is a methyl group at both the 1- and 2-positions. This preferred placement of the substituents also holds for the tri-substituted and tetrasubstituted side chains, i. e. alkyl groups at the 3-position having 3,4, or more alkyl substituents.

In addition to the process described above in Steps N and E' employing an alkyl 5-methylcyclohexanone-2-carboxylate, it will be understood that the compounds of the present invention may also be prepared by condensing the dihydroxybenzene products of Step M in Example I, Step D' in Example III, etc., with pulegone in accordance with the processes described in my above referred to Patent No. 2,419,934. It will also be understood that the hydrogen atom of the hydroxy group on the right hand ring may be replaced with an acyl group, e. g. to form the monoacetate derivative or be replaced with an alkyl group, e. g. to form the monomethyl ether derivative, and that the tetrahydro compounds of the present invention may be reduced to form the corresponding hexahydro products in accordance with the processes described in my Patent No. 2,419,937 dated May 6, 1947 and the applications referred to therein.

It is not known why the compounds of the present invention having multi-alkyl substituents on the 3-alkyl side chain are more active than compounds described heretofore. Tests, however, have demonstrated that by introducing two forks in the alkyl group physiological activity is greatly enhanced.

The present invention is not limited to the above examples which have been described in detail for illustrative purposes only.

I claim:

1. A 1-hydroxy-3-(alkyl)-6,6,9-trimethyl-7,8,9,10-tetrahydro-6-dibenzopyran represented by the following formula:

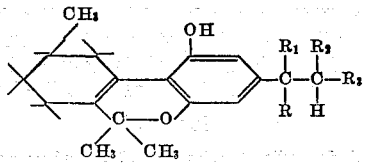

where R represents a lower alkyl group having one to five carbon atoms; one of $R_1$ and $R_2$ represents hydrogen, and the other of $R_1$ and $R_2$ represents a lower alkyl group having one to five carbon atoms; and $R_3$ represents a lower alkyl group having one to eight carbon atoms.

2. A dibenzopyran compound in accordance with claim 1 in which R and $R_1$ represent methyl groups and $R_2$ represents a hydrogen atom.

3. A dibenzopyran compound in accordance with claim 1 in which R and $R_2$ represent methyl groups and $R_1$ represents a hydrogen atom.

4. The compound, 1-hydroxy-3-(1',2'-dimethylheptyl)-6,6,9-trimethyl-7,8,9,10-tetrahydro-6-dibenzopyran.

5. The compound, 1-hydroxy-3-(1',1'-dimethylheptyl)-6,6,9-trimethyl-7,8,9,10-tetrahydro-6-dibenzopyran.

6. The compound, 1-hydroxy-3-(1',2'-dimethylbutyl)-6,6,9-trimethyl-7,8,9,10-tetrahydro-6-dibenzopyran.

7. The compound, 1-hydroxy-3-(1',1'-dimethylbutyl)-6,6,9-trimethyl-7,8,9,10-tetrahydro-6-dibenzopyran.

8. The compound, 1-hydroxy-3-(1'-ethyl-2'-methylpropyl)-6,6,9-trimethyl-7,8,9,10-tetrahydro-6-dibenzopyran.

ROGER ADAMS.

REFERENCES CITED

The following references are of record in the file of this patent:

UNITED STATES PATENTS

| Number | Name | Date |
|---|---|---|
| 2,229,574 | Jung | Jan. 21, 1941 |
| 2,378,698 | Gibbs | June 19, 1945 |
| 2,419,934 | Adams | May 6, 1947 |
| 2,419,935 | Adams | May 6, 1947 |
| 2,419,937 | Adams | May 6, 1947 |

OTHER REFERENCES

Russell et al., "Cannabis Indica," Journal of Chemical Society (London), December, 1941, page 826.

Adams et al., Jr. Amer. Chem. Soc., vol. 67, September, 1945, pages 1534–1537.